No. 765,015. PATENTED JULY 12, 1904.
R. KLINGER.
PACKING FOR STUFFING BOXES.
APPLICATION FILED MAY 12, 1904.
NO MODEL.
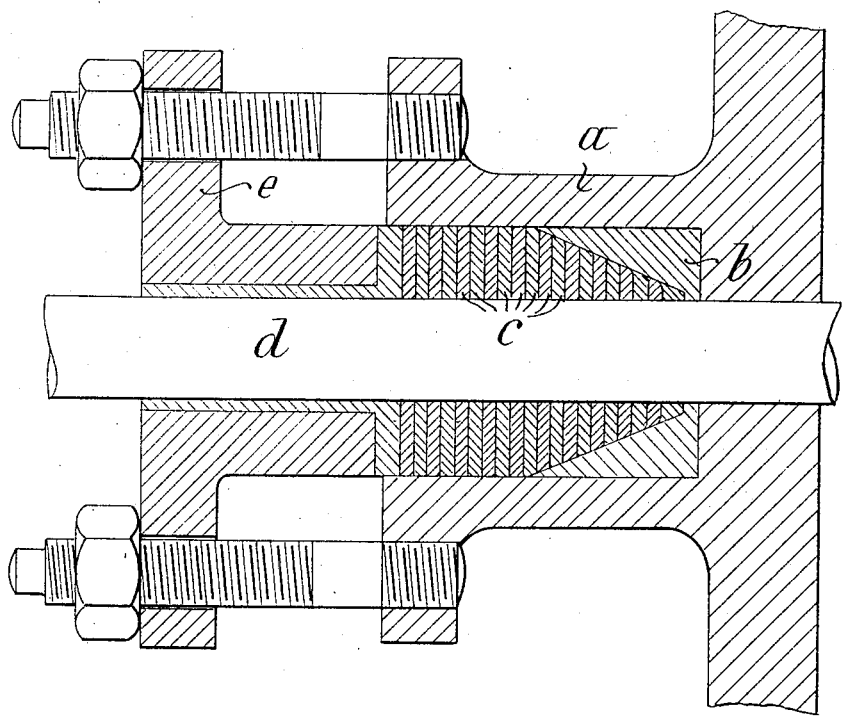
Witnesses
Inventor
Richard Klinger
By
James L. Norris.
Atty No. 765,015.

Patented July 12, 1904.

UNITED STATES PATENT OFFICE.

RICHARD KLINGER, OF GUMPOLDSKIRCHEN, AUSTRIA-HUNGARY.

PACKING FOR STUFFING-BOXES.

SPECIFICATION forming part of Letters Patent No. 765,015, dated July 12, 1904.

Application filed May 12, 1904. Serial No. 207,606. (No specimens.)

*To all whom it may concern:*

Be it known that I, RICHARD KLINGER, a subject of the Emperor of Austria-Hungary, residing at Gumpoldskirchen, Lower Austria, Empire of Austria-Hungary, have invented certain new and useful Improvements in Packing for Stuffing-Boxes, of which the following is a specification.

Packing for stuffing-boxes according to this invention has the property of forming a perfectly tight joint, of lubricating the part, such as a spindle or shaft, working in the stuffing-box, and of being capable of being used up completely without leaving any residue in the stuffing-box.

The improved packing is manufactured according to this invention as follows: Asbestos fibers are introduced in a solution of caoutchouc or suitable substitutes for caoutchouc in sufficient quantity to form a pasty or doughy mass, to which is added a suitable vulcanizing agent and also as much powdered graphite as will impart a thick tenacious consistency to the mixture. The ingredients are then intimately mixed together by stirring, so as to convert the mixture into a uniform or homogeneous mass, which is then molded into shape. This molding into shape may be effected by forming pieces or cords of any desired shape by pressing from the mass with the aid of heat. The mass may be passed through hot rolls to produce plates or sheets, from which rings, threads, or strips may be punched or cut, according to requirement. The heating of the mass has the result of evaporating the solvent in which the caoutchouc or caoutchouc substitute was dissolved.

In using the packing it is preferred to place a conical insertion on the bottom of the stuffing-box and then to press the packing into the stuffing-box onto this insertion. When rings made from the mass are employed, the rings which bear against the conical insertion-piece become deformed by the pressing in of the following packing-rings and are thus caused to fit tightly and closely against the sides of the stuffing-box and against the part of machinery working in the stuffing-box.

The accompanying drawing illustrates by way of example a suitable construction of stuffing-box packing according to this invention.

$a$ is the stuffing-box, and $b$ a conical metal insertion therein. The packing-rings $c$, composed of the mass hereinbefore referred to, are pressed into the stuffing-box. The pressing of the packing-rings tightly against one another and against the spindle or shaft $d$ may be effected by suitably tightening up the stuffing-box cover $e$.

The improved packing lubricates the spindle or shaft $d$ and is gradually consumed. A continuous tight joint can be effected by from time to time slacking the stuffing-box cover and inserting fresh packing-rings and then tightening up the cover again.

The material of which the packing is composed is consumed without leaving any residue in the stuffing-box, and it acts as a lubricant to the very last.

I claim—

The process for making a packing which consists in introducing asbestos fibers into a caoutchouc solution in sufficient quantity to form a pasty mass, adding a vulcanizing agent for the caoutchouc, adding powdered graphite to impart a thick tenacious consistency to the mixture, then intimately mixing the several ingredients to form a homogeneous mass, then molding the mass and heating the same, the heat serving to evaporate the solvent for the caoutchouc solution.

In testimony whereof I have hereunto set my hand in presence of two subscribing witnesses.

RICHARD KLINGER.

Witnesses:
    JOSEF RUBASCH,
    ALVESTO S. HOGUE.